United States Patent [19]

Beck

[11] Patent Number: 5,085,905
[45] Date of Patent: Feb. 4, 1992

[54] ADHESION OF ELASTOMERS TO BRASS PLATED WIRE

[75] Inventor: Harold D. Beck, Strafford, Mo.

[73] Assignee: Dayco Products, Inc., Dayton, Ohio

[21] Appl. No.: 534,893

[22] Filed: Jun. 6, 1990

[51] Int. Cl.$^5$ .................. B29D 22/00; C08L 81/00
[52] U.S. Cl. .................. 428/35.9; 428/36.91;
428/256; 428/462; 428/36.8; 156/307.3;
156/331.2; 156/331.5; 524/802; 524/881;
524/99; 524/96; 524/83
[58] Field of Search .................. 428/36.91, 256, 36.2,
428/295, 469, 462, 35.9, 36.8; 524/239, 274,
881, 566, 802, 99, 96, 83; 156/124, 307.3, 331.2,
333, 331.5

[56] References Cited
U.S. PATENT DOCUMENTS

| | | | |
|---|---|---|---|
| 2,701,221 | 2/1955 | Clayton, Jr. et al. | 154/46 |
| 3,112,772 | 12/1963 | Connor et al. | 138/138 |
| 3,443,986 | 5/1969 | Watanabe et al. | 117/138.8 |
| 3,480,508 | 11/1969 | Roy | 161/227 |
| 3,897,583 | 7/1975 | Bellamy | 428/256 |
| 4,075,159 | 2/1978 | Koyama et al. | 260/42.47 |
| 4,340,515 | 7/1982 | Frassek et al. | 524/274 |
| 4,405,758 | 9/1983 | Jablonski | 525/329.8 |
| 4,437,960 | 3/1984 | Zengel et al. | 204/181.7 |
| 4,605,693 | 8/1986 | Mowdood | 524/239 |
| 4,752,507 | 6/1988 | Johansson | 427/285.5 |
| 4,851,469 | 7/1989 | Saitoh | 524/566 |

OTHER PUBLICATIONS

*Vulcanization of Elastomers*, G. Alliger and I. J. Sjothun, p. 58, Reinhold Publishing Company, N.Y., NY, 1965.

Primary Examiner—James J. Seidleck
Assistant Examiner—Charles R. Nold
Attorney, Agent, or Firm—Joseph V. Tassone

[57] ABSTRACT

An elastomeric composition having improved adhesion to metal reinforcement is disclosed, said elastomeric composition comprising an elastomer containing, an adhesion promoting amount of a polysulfide having the formula

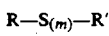

where m is an integer of from about 2 to 6; R and R' are the same or different and are

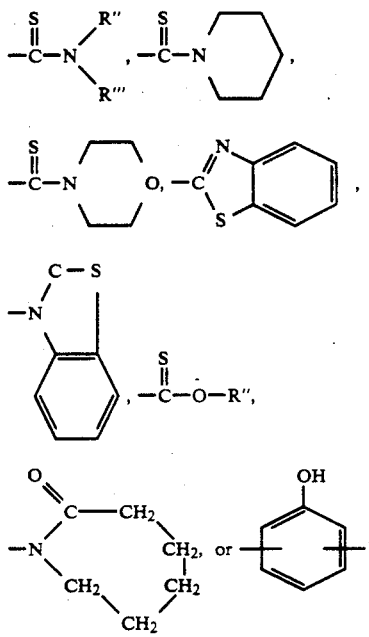

R" is an alkyl group of from about 1 to 4 carbon atoms; and R''' is an alkyl group of from about 1 to 4 carbon atoms or an aryl group.

35 Claims, 1 Drawing Sheet

ADHESION OF ELASTOMERS TO BRASS PLATED WIRE

BACKGROUND OF THE INVENTION

1. Field of Invention

The invention relates to the adhesion of elastomers to a brass plated reinforcing wire, wherein the elastomers contain a polysulfide as an adhesion promoter.

2. Prior Art Statement

It is well known in the art to reinforce rubber articles or products with metal elements such as steel wire. It is, of course, of the utmost importance that the bond between the rubber and the metal element should be as strong as possible and remain intact over a long period of time, even under severe conditions. One of the problems which has been recognized is that steel is very prone to oxidation, which even in minor degrees is highly deleterious to the rubber-metal bond. The corrosion problem generally has been eliminated by coating the steel wire with brass or other alloys.

Further improvement in the adhesion of rubber to coated wire, particularly brass plated steel wire, has been proposed. For example, U.S. Pat. No. 4,605,693 to Mowdood discloses rubber articles reinforced with brass plated steel wire elements, wherein the rubber article contains an adhesion promoter selected from the group consisting of allyl phosphate esters, allyl phosphite esters, 5-nitro isatoic anhydride, iminodiacetic acid, and salts thereof.

U.S. Pat. No. 3,897,583 to Bellamy discloses improved adhesion of rubber to metal wire, particularly brass coated wire using a cobalt salt dispersed in the rubber.

U.S. Pat. No. 4,340,515 to Frassek et al. teaches a use of a solid rubber adhesion promoter composition comprising cobalt naphthenate, nickel naphthenate or a mixture thereof and cobalt resinate, nickel resinate or a mixture thereof to improve the adhesion of rubber to a brass plated wire.

U.S. Pat. No. 4,075,159 to Koyama et al. teaches the addition of benzoic acid or monohydroxybenzoic acid to rubber to improve the adhesion of rubber to brass plated reinforcing elements.

U.S. Pat. No. 3,112,772 to Connor et al. discloses the use of a lead salt such as lead acetate, lead subacetate or lead carbonate uniformly dispersed in a polychloroprene elastomer to increase bonding of the elastomer to metal reinforcing elements.

U.S. Pat. No. 4,851,469 to Saitoh discloses the use of a combination of silica, a resorcin donor, a methylene donor and an organic sulfur-containing compound to improve the adhesion of sulfur-vulcanizable rubber to brass.

U.S. Pat. No. 3,443,986 to Wanatabe et al. teaches a process for treating nylon or rayon fiber with a composition containing resorcinol, formolin, rubber latex and a wax to improve the adhesion of said fibers to rubber.

U.S. Pat. No. 3,480,508 to Roy teaches the improvement in adhesion of nylon cord to rubber in the manufacture of tires by inclusion of dibenzothiazyldisulfide, mercaptobenzothiazol, tetramethylthuiuram disulfide and a quinone dioxime in the rubber vulcanization recipe.

U.S. Pat. No. 4,752,507 to Johansson et al. teaches increasing the adhesion of rubber to a substrate by the addition of a vulcanizing agent consisting of sulfur and at least one unsaturated reactant such as d-limonene, 5-ethylidene-2-norbornene, styrene, or dicyclopentadiene.

U.S. Pat. No. 2,701,221 to Clayton, Jr. et al. teaches the use of tetramethylthiuram disulfide as an accelerator for a rubber cement in the bonding of low unsaturation rubber to natural rubber.

U.S. Pat. No. 4,405,758 to Jablonsky shows tetramethylthiuram disulfide or group IB, IIB, IVA, VA, or VIA salts thereof in combination with sodium stearate as being an effective accelerator for acrylate rubbers containing both carboxyl and active halogen groups.

In the present application, it has been found that certain of the polysulfides function as a retarder in the elastomers of the present invention.

SUMMARY OF THE INVENTION

This invention relates to elastomeric compositions containing a polysulfide as an adhesion promoter to increase the adhesion between the elastomer and a metal reinforcing element while substantially maintaining original and aged physical properties.

This invention also relates to elastomeric articles of manufacture such as laminates which have embedded therein metal reinforcement elements. The elastomeric articles comprise an elastomer and a polysulfide as an adhesion promoter.

This invention also relates to a method of bonding an elastomeric composition to a metal reinforcing element comprising the step of bonding to said metal reinforcing element an elastomeric composition containing the above polysulfide adhesion promoter.

DESCRIPTION OF THE PREFERRED EMBODIMENTS

Figure 1:
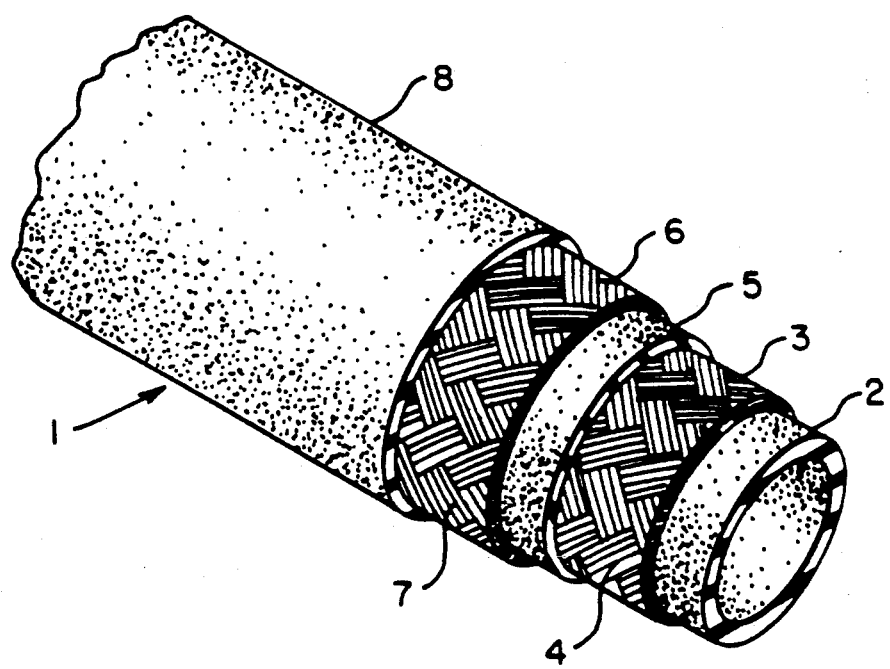
FIG. 1 is a fragmentary perspective view of a steel wire reinforced elastomeric hose partially dissected to illustrate layers of steel wire reinforcement imbedded therein.

While the various features of this invention are illustrated and described as being particularly adapted to provide a steel wire reinforced hose construction, it is to be understood that the various features of this invention can be utilized in other elastomeric articles of manufacture such as tires, conveyor belts, power transmission belts, and any number of other elastomeric articles in which metal wire reinforcing elements are desired.

Therefore, this invention is not to be limited to only the embodiments illustrated in the drawings. The drawings are merely meant to be illustrative of the wide variety of uses of this invention.

Referring now to FIG. 1, there is illustrated a simple wire reinforced hose 1 comprising an inner elastomeric layer 2 surrounded by a first reinforcing layer 3 consisting of a woven or braided steel wire 4 about which is disposed a second elastomeric layer 5 which in turn is surrounded by a second reinforcing layer 6 of similar wire 7 overlaid by an outer elastomeric cover 8. In addition to one or more steel reinforcement layers, a typical wire reinforced hose may also contain additional materials and features such as an extruded crosslinked polyolefin inner tube, which is impervious to chemicals and solvents; other complimentary reinforcing layers, such as textiles; and various other insulating materials.

DETAILED DESCRIPTION OF THE INVENTION

Elastomeric articles quite frequently contain metal elements as structural reinforcements. Some examples of elastomeric articles that quite frequently contain metal reinforcing elements include tires, power transmission belts, conveyor belts, hoses, and a variety of other manufactured elastomer products and component parts. Some representative examples of elastomers commonly used in the composition of this invention include ethylene/acrylic elastomers, natural rubber, styrene-butadiene rubber, synthetic polyisoprene, polychloroprene, cyclene rubbers, polybutadiene, nitrile rubbers, carboxylated nitrile rubbers, butyl rubbers, isoprene/styrene copolymers, halogenated butyl rubbers, EPDM (ethylene-propylene-diene) rubbers, epichlorohydrin homo and copolymers, EPR (ethylene-propylene rubbers), polyisobutylene, norbornene rubbers, thiokol rubbers, and blends of various combinations of these and other diene rubbers.

Many terms are used to describe the metal reinforcing elements used to strengthen elastomeric articles. The terms "cord", "gauze", "cable", "strand", "wire", "rod", "plate", and "filament" can all be used to describe metal reinforcing elements used to strengthen such articles. The term "metal reinforcement" as used herein is devised to be generic to all elements for reinforcing elastomeric articles including those listed above. Thus, without being limited thereto, a metal reinforcement can be a metal wire, a metal cord, a metal gauze, a metal cable, a metal strand, a metal rod, a metal plate, or a metal filament.

The metal reinforcements used in the practice of this invention can have a wide variety of structural configurations, but will generally be metal cords, cables, or wires. For example, a wire cord used in the practice of this invention can be composed of 1 to 50 or even more filaments of metal wire which are twisted or cabled together to form a metal cord. Therefore, such a cord can be monofilament in nature, or can be composed of multiple filaments. For example, the cords used in automobile tires generally are composed of three to six cabled filaments, the cords used in truck tires normally contain 10 to 30 cabled filaments, and the cords used in giant earth mover tires generally contain 40 to 50 cabled filaments.

The metal cords used in the manufacture of a hose construction are generally single filaments and are usually laid in side by side relationship utilizing a braiding machine wherein the number of metal cords and number of sets of metal cords is selected to ensure proper coverage of the tube and to conform to industry standards or customer burst standards. In the braiding of hose, the metal cords are, for example, arranged in twelve sets, called twelve carrier, and have ten metal cords in each set. The individual sets are overlapped in braiding fashion to provide the structure found in each reinforcing layer 3 and/or 6, as shown in FIG. 1. In an unbalanced construction, the number of metal cords in each set may be different while maintaining the number of carriers or sets.

The metal generally used in the reinforcing elements of this invention is steel. The term steel as used in the present specification and claims refers to what is commonly known as carbon steel, which is also called high-carbon steel, ordinary steel, straight carbon steel, and plain carbon steel. An example of such a steel is American Iron and Steel Institute Grade 1070-high-carbon steel (AISI 1070). Such steel owes its properties chiefly to the presence of carbon without substantial amounts of other alloying elements. It is generally preferred for steel reinforcements to be individually coated or plated with a transition metal or alloy thereof. Some representative examples of suitable transition metals and alloys thereof include: zirconium, cerium, lanthanum, nickel, cobalt, tin, titanium, zinc, copper, brass, and bronze. Brass is an alloy of copper and zinc which can contain other metals in varying lesser amounts and bronze is an alloy of copper and tin which sometimes contains traces of other metals. The metal reinforcements which are generally most preferred for use in the practice of this invention are brass plated carbon steels. Alpha brass, which contains from about 62 to 75 percent copper and 38 to 25 percent zinc, is preferred for coating the metal reinforcements of this invention.

The polysulfide adhesion promoters of this invention have the general formula:

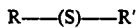

where N is an integer of from about 2 to 6;
R and R' are the same or different and are

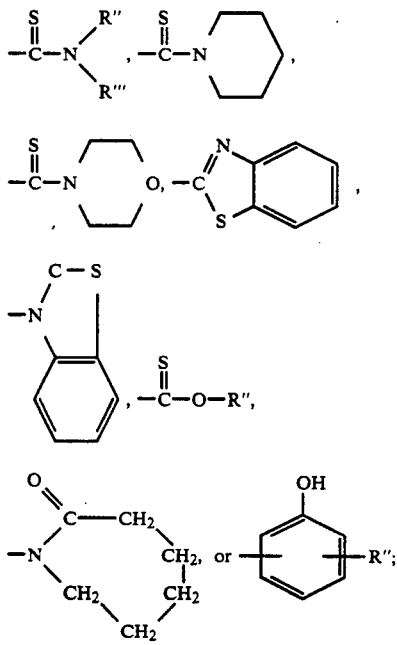

R" is an alkyl group of from about 1 to 4 carbon atoms; and R''' is an alkyl group of from about 1 to 4 carbon atoms or an aryl group.

Specific examples of polysulfides useful as adhesion promoters in the present invention are tetraalkylthiuram polysulfides such as tetramethylthiuram disulfide, tetraethylthiuram disulfide, and tetrabutylthiuram disulfide; N, N'-dialkyl-N,N'-diarylthiuram disulfides, such as N,N'-dimethyl-N,N'-diphenylthuiram disulfide; dipentaalkylenethiuram polysulfides such as dipentamethylenethiuram hexasulfide; dimorpholino polysulfides such as dimorpholino disulfide; dialkylmorpholinothiuram polysulfides such as dimethylmorpholinothiuram disulfide; 2-(morpholinodithio)-benzothiozole; dialkylxanthogens such as dibutyl-xanthogen disulfide; dicaprolactam polysulfides (polythiodicaprolactam) such as dicaprolactam disulfide (dithiodicaprolactam); benzothiazyl polysulfides such as benzothiazyl disulfide; alkylphenol polysulfide such as methylphenol disulfide; disulfides of 1, 3, 5-triazine; 4-morpholinyl-3-benzothiazol disulfies; dibenzamido diphenyl disulfide; N,N'-meta-phenylenedimaleimide/dipentamethylenethiuram disulfide; and blends thereof.

The polysulfide adhesion promoters can be mixed into the elastomer using ordinary compounding techniques. Generally, it will be convenient to mix the adhesion promoter into the elastomer composition simultaneously with other desired compounding ingredients using any suitable mixing equipment known to those skilled in the art, such as a Banbury mixer or mill mixer. Normally the elastomers used in this invention will be compounded with carbon black, however, other mineral fillers, such as clay and silica may be used as partial or total replacements for carbon black. The elastomer compositions of this invention commonly will contain numerous other ingredients such as cure accelerators, scorch inhibitors, antidegradents, pigments, and processing oils. Typically, such ingredients include stearic acid, fatty alcohol phosphates, aliphatic amines, aromatic amines, di-ortho-toylguanidine, hexamethoxymethylmelamine, etc. In the practice of this invention the elastomeric composition generally will employ the polysulfides in an amount of from about 0.1 to about 5 parts and preferably from about 0.5 parts to about 2.5 parts per hundred parts of elastomer.

The polysulfides described herein can be distributed as a pre-mix or each of the components can be mixed individually throughout the elastomer using any convenient technique known to those skilled in the art. The elastomer compositions of this invention are also cured under pressure at a temperature ranging from about 220° F. to about 375° F. with the metal reinforcement being embedded in the elastomer. It is generally preferred that the elastomer be cured in the presence of an amine or similar curing agent at a temperature ranging from 280° F. to about 350° F.

The practice of the present invention results in improved rubber-metal adhesion as well as an overall improved balance of properties. The following examples are excerpts of a larger designed experiment and are included to further illustrate the rubber compositions for adhesion to brass plated metal within the scope of this invention and to compare them with other rubber compositions outside its scope including the control composition (Example 22) for use as the elastomeric layers 2, 5 and 8 of the hose shown in FIG. 1. Such comparisons clearly show the superior adhesion obtained by practicing the present invention. The examples are merely for the purpose of illustration and are not to be regarded as limiting the scope of the invention or the manner in which it can be practiced. Unless specifically indicated otherwise, all parts and percentages are given by weight.

EXAMPLES 1–22

The elastomeric compositions shown in Table 1 were prepared using the following procedure: The ingredients 0 listed are carefully weighed and placed in suitable containers adjacent the mixing device, in this case a mixer comprising lobed rotors displaced in a shaped cavity such that the clearances between the rotors and the sides of the cavity are sufficiently small to cause mastication of the rubber material. A commonly known device is a Banbury mixer manufactured by the Farrel Corp. of Ansonia, CT. The fill factor was maintained at 60%, that is to say, the volume of the free space in the cavity is 60% filled by the volume of the ingredients. In this case, all the ingredients are added to the mixer at one time. The ram is closed and the mix cycle started. Twice during the mixing, the ram is raised and swept with a small broom or bounced rapidly, and closed. The mixing continues until the temperature of the batch reaches 200° C. at which time the batch is dropped by opening the lower door.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Additive | | | | | | | | | | | |
| VAMAC-G[1] | 514.3 | 523.2 | 523.5 | 503.2 | 526.1 | 502.5 | 505.5 | 504.8 | 513.5 | 514.6 | 516.3 |
| Carbon Black | 565.7 | 575.5 | 575.9 | 553.5 | 578.7 | 552.7 | 556.0 | 555.2 | 564.9 | 566.1 | 567.9 |
| VANFRE VAM[2] | 2.6 | 2.6 | 2.6 | 2.5 | 2.6 | 2.5 | 2.5 | 2.5 | 2.6 | 2.6 | 2.6 |
| Stearic Acid | 10.3 | 10.5 | 10.5 | 10.1 | 10.5 | 10.0 | 10.1 | 10.1 | 10.3 | 10.3 | 10.3 |
| Armeen 18D[3] | 2.6 | 2.6 | 2.6 | 2.5 | 2.6 | 2.5 | 2.5 | 2.5 | 2.6 | 2.6 | 2.6 |
| Thiokol TP-759[4] | 51.4 | 52.3 | 52.4 | 50.3 | 52.6 | 50.2 | 50.5 | 50.5 | 51.4 | 51.5 | 51.6 |
| Naugard 445[5] | 10.3 | 10.5 | 10.5 | 10.1 | 10.5 | 10.0 | 10.1 | 10.1 | 10.3 | 10.3 | 10.3 |
| Chem-Master R-908[6] | 12.9 | 13.1 | 13.1 | 12.6 | 13.2 | 12.6 | 12.6 | 12.6 | 12.8 | 12.9 | 12.9 |
| DOTG[7] | 20.6 | 20.9 | 20.9 | 20.1 | 21.0 | 20.1 | 20.2 | 20.2 | 20.5 | 20.6 | 20.7 |
| Ucarsil DSCl8[8] | 3.1 | 3.1 | 5.2 | 5.0 | 3.2 | 3.0 | 3.0 | 1.0 | 1.0 | 5.1 | 1.0 |
| SiO$_2$, ppt'd | 64.3 | 26.2 | 66.2 | 100.6 | 26.3 | 100.5 | 101.1 | 101.0 | 64.2 | 64.3 | 64.5 |
| TMTD[9] | 6.4 | 10.5 | 6.5 | 6.3 | 2.6 | 10.0 | 2.5 | 6.3 | 10.3 | 2.6 | 2.6 |
| DPTT[10] | 0 | 0 | 0 | 0 | 0 | 0 | 0 | 0 | 0 | 0 | 0 |
| TETD[11] | 0 | 0 | 0 | 0 | 0 | 0 | 0 | 0 | 0 | 0 | 0 |
| 80% Dithiocaprolactam | 0 | 0 | 0 | 0 | 0 | 0 | 0 | 0 | 0 | 0 | 0 |
| | 1264.5 | 1251.0 | 1249.9 | 1276.8 | 1249.9 | 1276.6 | 1276.6 | 1276.8 | 1264.4 | 1263.5 | 1263.3 |

| | 12 | 13 | 14 | 15 | 16 | 17 | 18 | 19 | 20 | 21 | 22 |
|---|---|---|---|---|---|---|---|---|---|---|---|
| Additive | | | | | | | | | | | |
| VAMAC-G[1] | 527.7 | 514.3 | 511.9 | 532.0 | 531.2 | 511.9 | 514.4 | 513.6 | 531.2 | 533.5 | 536.2 |
| Carbon Black | 578.3 | 565.7 | 563.1 | 585.2 | 584.3 | 563.1 | 565.8 | 564.9 | 584.3 | 586.8 | 589.8 |
| VANFRE VAM[2] | 2.6 | 2.6 | 2.6 | 2.7 | 2.7 | 2.6 | 2.6 | 2.6 | 2.7 | 2.7 | 2.7 |
| Stearic Acid | 10.5 | 10.3 | 10.2 | 10.6 | 10.6 | 10.2 | 10.3 | 10.3 | 10.6 | 10.7 | 10.7 |

TABLE 1-continued

| | Example | | | | | | | | | | |
|---|---|---|---|---|---|---|---|---|---|---|---|
| Armeen 18D[3] | 2.6 | 2.6 | 2.6 | 2.7 | 2.7 | 2.6 | 2.6 | 2.6 | 2.7 | 2.7 | 2.7 |
| Thiokol TP-759[4] | 52.6 | 51.4 | 51.2 | 53.2 | 53.1 | 51.2 | 51.4 | 51.4 | 53.1 | 53.3 | 53.6 |
| Naugard 445[5] | 10.5 | 10.3 | 10.2 | 10.6 | 10.6 | 10.2 | 10.3 | 10.3 | 10.6 | 10.7 | 10.7 |
| Chem-Master R-908[6] | 13.1 | 12.9 | 12.8 | 13.3 | 13.3 | 12.8 | 12.9 | 12.8 | 13.3 | 13.3 | 13.4 |
| DOTG[7] | 21.0 | 20.6 | 20.5 | 21.3 | 21.2 | 20.5 | 20.6 | 20.5 | 21.2 | 21.3 | 21.4 |
| Ucarsil DSC18[8] | 1.1 | 3.1 | 5.1 | 0 | 0 | 3.1 | 3.1 | 0 | 0 | 0 | 0 |
| SiO$_2$, ppt'd | 26.3 | 64.3 | 64.0 | 0 | 0 | 64.0 | 64.3 | 64.2 | 0 | 0 | 0 |
| TMTD[9] | 6.6 | 6.4 | 10.2 | 0 | 0 | 0 | 0 | 0 | 0 | 0 | 0 |
| DPTT[10] | 0 | 0 | 0 | 10.6 | 0 | 0 | 0 | 0 | 0 | 0 | 0 |
| TETD[11] | 0 | 0 | 0 | 0 | 10.6 | 0 | 0 | 0 | 0 | 0 | 0 |
| 80% Dithiocaprolactam | 0 | 0 | 0 | 0 | 0 | 10.2 | 5.1 | 10.3 | 10.6 | 5.3 | 0 |
| | 1250.9 | 1264.5 | 1264.4 | 1242.2 | 1240.3 | | | | | | |

[1]Gum ethylene/acrylic elastomer manufactured by DuPont
[2]Organic phosphate ester manufactured by GAF
[3]Octadecanamine manufactured by AKZO
[4]Ether/ester mixture manufactured by Morton Thiokol
[5]Diphenylamine manufactured by Uniroyal
[6]4,4-methylenedianiline manufactured by Synpro-Ware
[7]Di-ortho-toylguanidine
[8]70% proprietory silane on synthetic calcium silicate manufactured by Union Carbide
[9]Tetramethylthiuram hexasulfide
[10]Dipentamethylenethiuram hexasulfide
[11]Tetraethylthiuram disulfide The compositions of Examples 1–22 were used to prepare elastomeric materials for hose sections having brass plated wire embedded therein. The elastomeric materials were cured for 60 minutes at 320 F and then a portion was aged for 70 hours at 302.F and tested according ASTM D1871, a standard adhesion test, to determine the adhesiveness of the elastomer to the brass plated wire, and to ASTM D16 and ASTM E036, as well, to determine original and aged tensile strength and elongation. The results are shown in Table 2.

ing from low adhesion to low aged elongation when compared to Example 22. Example 22 is a control prepared from an ethylene/acrylic polymer composition utilized in the manufacture of hose. The adhesion of this compound is very low, 3 pounds per lineal inch, while the original and aged properties are 5 desirable.

Having described the invention in detail and by reference to preferred embodiments thereof, it will be apparent that modifications and variations are possible without departing from the scope of the invention defined in

TABLE 2

| | Test | | | | | | | | | | | | | | | |
|---|---|---|---|---|---|---|---|---|---|---|---|---|---|---|---|---|
| | Ex. 1 | | Ex. 2 | | Ex. 3 | | Ex. 4 | | Ex. 5 | | Ex. 6 | | Ex. 7 | | Ex. 8 | |
| | orig. | aged | orig. | aged | orig. | aged | orig. | aged | orig. | aged | orig. | aged | orig. | aged | orig. | aged |
| Tensile, psi | 1231 | 1831 | 1108 | 1754 | 1173 | 1728 | 1236 | 1753 | 1261 | 1587 | 1227 | 1734 | 1278 | 1742 | 1226 | 1672 |
| Elongation, % | 182 | 133 | 252 | 147 | 187 | 125 | 144 | 120 | 198 | 110 | 189 | 102 | 186 | 117 | 191 | 102 |
| Durometer, Shore A | 79 | 87 | 78 | 88 | 78 | 86 | 85 | 89 | 80 | 86 | 83 | 92 | 83 | 90 | 83 | 88 |
| Adhesion[1] | 17.0 | | 22.5 | | 12.5 | | 15.5 | | 7.0 | | 14.0 | | 7.0 | | 17.5 | |
| Mooney 212° F. | 60.4 | | 46.8 | | 50.3 | | 83.7 | | 52.5 | | 81.6 | | 83.7 | | 80.3 | |

| | Ex. 9 | | Ex. 10 | | Ex. 11 | | Ex. 12 | | Ex. 13 | | Ex. 14 | | Ex. 15[2] | | Ex. 16[2] | |
|---|---|---|---|---|---|---|---|---|---|---|---|---|---|---|---|---|
| | orig. | aged | orig. | aged | orig. | aged | orig. | aged | orig. | aged | orig. | aged | orig. | aged | orig. | aged |
| Tensile, psi | 1143 | 1680 | 1224 | 1744 | 1281 | 1741 | 1142 | 1651 | 1132 | 1657 | 1092 | 1714 | — | — | — | — |
| Elongation, % | 201 | 138 | 195 | 135 | 181 | 143 | 250 | 142 | 206 | 129 | 228 | 142 | — | — | — | — |
| Durometer, Shore A | 80 | 88 | 79 | 88 | 80 | 88 | 78 | 86 | 81 | 88 | 81 | 90 | — | — | — | — |
| Adhesion[1] | 18.0 | | 17.5 | | 8.0 | | 10.0 | | 12.5 | | 13.5 | | 17.0 | | 18.0 | |
| Mooney 212° F. | 58.9 | | 60.1 | | 60.8 | | 48.4 | | 60.4 | | 61.0 | | — | | — | |

| | Ex. 17 | | Ex. 18 | | Ex. 19 | | Ex. 20 | | Ex. 21 | | Ex. 22 | |
|---|---|---|---|---|---|---|---|---|---|---|---|---|
| | orig. | aged | orig. | aged | orig. | aged | orig. | aged | orig. | aged | orig. | aged |
| Tensile, psi | 1173 | 1852 | 1379 | 1773 | 1394 | 1904 | 1395 | 1791 | 1310 | 1608 | 1297 | 1604 |
| Elongation, % | 151 | 110 | 171 | 96 | 165 | 134 | 175 | 149 | 185 | 124 | 200 | 168 |
| Durometer, Shore A | 78 | 88 | 79 | 88 | 79 | 90 | 75 | 86 | 76 | 85 | 80 | 87 |
| Adhesion[1] | 34.0 | | 11.0 | | 32.0 | | 26.0 | | 17.0 | | 3.0 | |
| Mooney 212° F. | — | | — | | — | | — | | — | | 41.2 | |

[1]samples were cured for 60 minutes
[2]samples were tested for adhesion only

Examples 1 through 21 were mixed, cured and tested to determine the best ratio of the inventive ingredients in order to attain the highest possible adhesion to brass plated wire while maintaining the level of original and aged properties. The experienced rubber chemist will select a compound based upon the best balance of properties and may also further alter the compound to provide the most competitive cost. As observed in Table 2, some of the examples in Table I have deficiencies rangthe appended claims.

What is claimed is:

1. An ethylene/acrylic elastomeric composition having improved adhesion to metal reinforcement upon heating at an adhesion-effective temperature, said elastomeric composition consisting essentially of an ethylene/acrylic elastomer, a curing agent selected from the group consisting of amines and peroxides, and an adhesion promoting amount of a polysulfide having the formula

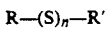

where n is an integer of from about 2 to 6; R and R' are the same or different and are

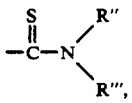

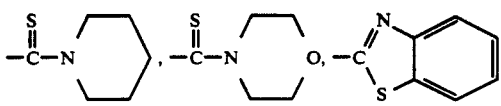

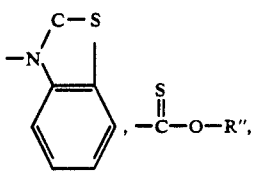

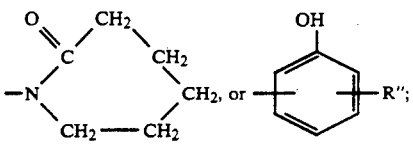

R" is an alkyl group of from about 1 to 4 carbon atoms; and R''' is an alkyl group of from about 1 to 4 carbon atoms or an aryl group.

2. The elastomeric composition of claim 1 wherein said metal wire reinforcement is a brass plated steel wire reinforcement.

3. The elastomeric composition of claim 1 wherein said polysulfide is a tetraalkylthiuram polysulfide, a dipentaalkylenethiuram polysulfide, or a dicaprolactam polysulfide.

4. The elastomeric composition of claim 3 wherein said polysulfide is tetramethylthiuram disulfide.

5. The elastomeric composition of claim 3 wherein said polysulfide is tetraethylthiuram disulfide.

6. The elastomeric composition of claim 3 wherein said polysulfide is dipentamethylenethiuram hexasulfide.

7. The elastomeric composition of claim 3 wherein said polysulfide is dicaprolactam disulfide.

8. The elastomeric composition of claim 3 wherein said elastomer contains from about 0.1 parts to about 5 parts of said polysulfide per 100 parts by weight of said elastomer.

9. The elastomeric composition of claim 8 wherein said elastomer contains from about 0.5 parts to about 2.5 parts of said polysulfide per 100 parts by weight of said elastomer.

10. The elastomeric composition of claim 1 wherein said curing agent is an amine.

11. A method of adhering an ethylene/acrylic elastomer to a metal reinforcement embedded therein which comprises:

applying said ethylene/acrylic elastomer to said metal reinforcement, said ethylene/acrylic elastomer containing a curing agent selected from the group consisting of amines and peroxides, and an adhesion promoting amount of a polysulfide having the formula

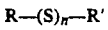

where n is an integer of from about 2 to 6; R and R' are the same of different and are

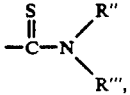

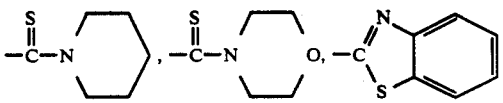

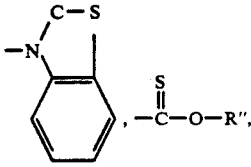

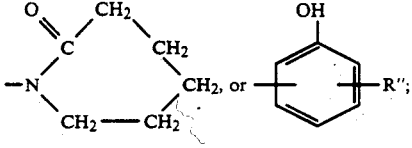

R" is an alkyl group of from about 1 to 4 carbon atoms; and R''' is an alkyl group of from about 1 to 4 carbon atoms or an aryl group; and heating said ethylene/acrylic elastomer and said metal reinforcement at a temperature sufficient to effect adhesion of said ethylene/acrylic elastomer to said metal reinforcement.

12. The method of claim 11 wherein said metal reinforcement is a brass plated steel wire reinforcement.

13. The method of claim 11 wherein said polysulfide is a tetralkylthiuram polysulfide, a dipentaalkylenethiuram polysulfide, or a dicaprolactam polysulfide.

14. The method of claim 13 wherein said polysulfide is tetramethylthiuram disulfide.

15. The method of claim 13 wherein said polysulfide is tetraethylthiuram disulfide.

16. The method of claim 13 wherein said polysulfide is dipentamethylenethiuram hexasulfide.

17. The method of claim 13 wherein said polysulfide is dicaprolactam disulfide.

18. The method of claim 13 wherein said ethylene/acrylic elastomer contains from about 0.1 to about 5 parts of said polysulfide per 100 parts by weight of said elastomer.

19. The method of claim 18 wherein sai- ethylene/acrylic elastomer contains from about 0.5 parts to 2.5 parts of said polysulfide per 100 parts by weight of said elastomer.

20. The method of claim 11 wherein said curing agent is an amine.

21. A laminate comprising at least one layer of an ethylene/acrylic elastomer and at least one layer of a metal reinforcement, said ethylene/acrylic elastomer containing a curing agent selected from the group consisting of amines and peroxides, and an adhesion promoting amount of a polysulfide having the formula $$R-(S)_n-R'$$

where n is an integer of from about 2 to 6; R and R' are the same or different and are

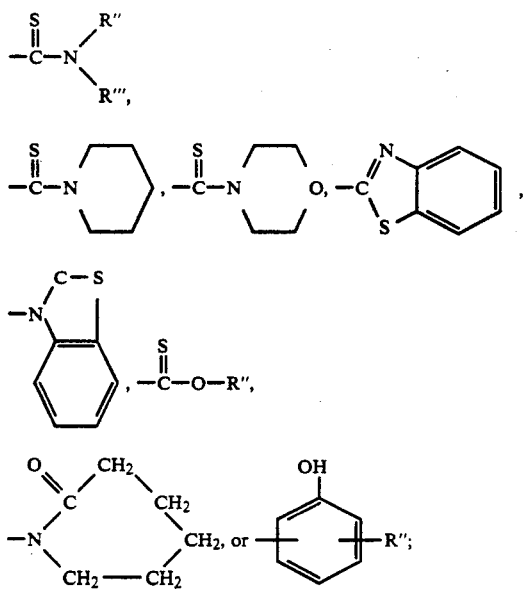

R" is an alkyl group of from about 1 to 4 carbon atoms; R'" is an alkyl group of from about 1 to 4 carbon atoms or an aryl group, said laminate exhibiting improved adhesion of said ethylene/acrylic elastomer to said metal reinforcement upon heating said laminate at a temperature sufficient to effect adhesion of said ethylene/acrylic elastomer to said metal reinforcement.

22. The laminate of claim 21 wherein said metal reinforcement is a brass plated steel wire reinforcement.

23. The laminate of claim 21 wherein said polysulfide is a tetraalkylthiuram polysulfide, a dipentaalkylene-thiuram polysulfide, or a dicaprolactam polysulfide.

24. The laminate of claim 23 wherein said polysulfide is tetramethylthiuram disulfide.

25. The laminate of claim 23 wherein said polysulfide is tetraethylthiuram disulfide.

26. The laminate of claim 23 wherein said polysulfide is dipentamethylenethiuram hexasulfide.

27. The laminate of claim 23 wherein said polysulfide is dicaprolactam disulfide.

28. The laminate of claim 23 wherein said ethylene/acrylic elastomer contains from about 0.1 to about 5 parts of said polysulfide per 100 parts by weight of said elastomer.

29. The laminate of claim 28 wherein said ethylene/acrylic elastomer contains from about 0.5 to about 2.5 parts of said polysulfide per 100 parts by weight of said elastomer.

30. The laminate of claim 21 wherein said curing agent is an amine.

31. The laminate of claim 21 wherein said laminate is in the form of a hose.

32. In a method for adhering an ethylene/acrylic elastomer to a brass plated wire reinforcement embedded therein, the improvement which comprises:
applying said ethylene/acrylic elastomer to said brass plated wire reinforcement, said ethylene/acrylic elastomer containing a curing agent selected from the group consisting of amines and peroxides, and an adhesion promoting amount of a polysulfide having the formula $$R-(S)_n-R'$$

where n is an integer of from about 2 to 6; R and R' are the same or different and are selected from the group consisting of

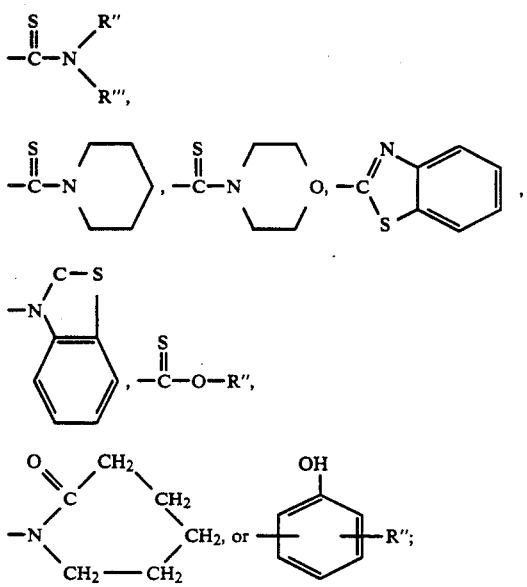

R" is an alkyl group of from about 1 to 4 carbon atoms, and R'" is an alkyl group of from about 1 to 4 carbon atoms or an aryl group; and
heating said ethylene/acrylic elastomer having said metal reinforcement embedded therein at a temperature of about 220° to 375° F. to effect improved bonding of said ethylene/acrylic elastomer to said brass plated wire reinforcement.

33. The elastomer composition of claim 10 wherein said ethylene/acrylic elastomer is cured at a temperature of about 220° to 375° F.

34. The method of claim 20 wherein said ethylene/acrylic elastomer is cured at a temperature of about 220° to 375° F.

35. The laminate of claim 30 wherein said ethylene/acrylic elastomer is cured at a temperature of about 220° to 375° F.

* * * * *